United States Patent
Katsuyama et al.

(10) Patent No.: US 8,497,879 B2
(45) Date of Patent: Jul. 30, 2013

(54) INFORMATION PROCESSING APPARATUS, DISPLAY PROCESSING METHOD, AND COMPUTER PROGRAM PRODUCT THEREFOR

(75) Inventors: Goro Katsuyama, Kanagawa (JP); Yuji Suzuki, Chiba (JP)

(73) Assignee: Ricoh Company, Limited, Tokyo (JP)

( * ) Notice: Subject to any disclaimer, the term of this patent is extended or adjusted under 35 U.S.C. 154(b) by 728 days.

(21) Appl. No.: 12/718,524

(22) Filed: Mar. 5, 2010

(65) Prior Publication Data

US 2010/0238197 A1 Sep. 23, 2010

(30) Foreign Application Priority Data

Mar. 18, 2009 (JP) .................... 2009-067131

(51) Int. Cl.
G09G 5/00 (2006.01)

(52) U.S. Cl.
USPC ........................................ 345/656

(58) Field of Classification Search
USPC ........................................ 345/655
See application file for complete search history.

(56) References Cited

U.S. PATENT DOCUMENTS

| | | | | | |
|---|---|---|---|---|---|
| 5,973,664 | A | * | 10/1999 | Badger | 345/659 |
| 6,137,468 | A | * | 10/2000 | Martinez et al. | 345/649 |
| 7,002,604 | B1 | * | 2/2006 | Barrus et al. | 345/649 |
| 7,406,666 | B2 | * | 7/2008 | Davis et al. | 715/863 |
| 7,570,273 | B1 | * | 8/2009 | de Waal | 345/649 |
| 7,573,490 | B1 | * | 8/2009 | de Waal | 345/649 |
| 7,598,967 | B1 | * | 10/2009 | de Waal | 345/649 |
| 7,609,281 | B1 | * | 10/2009 | De Waal | 345/649 |
| 7,629,987 | B1 | * | 12/2009 | De Waal | 345/649 |
| 7,782,342 | B2 | * | 8/2010 | Koh | 345/659 |
| 8,022,969 | B2 | * | 9/2011 | Elliott | 345/649 |
| 8,031,212 | B2 | * | 10/2011 | Nicolas et al. | 345/659 |
| 8,068,121 | B2 | * | 11/2011 | Williamson et al. | 345/659 |
| 8,314,817 | B2 | * | 11/2012 | Williamson et al. | 345/659 |
| 2007/0035564 | A1 | | 2/2007 | Katsuyama | |
| 2009/0002391 | A1 | * | 1/2009 | Williamson et al. | 345/619 |
| 2009/0305743 | A1 | * | 12/2009 | Gouesbet et al. | 455/566 |
| 2010/0066763 | A1 | * | 3/2010 | MacDougall et al. | 345/656 |
| 2010/0085382 | A1 | * | 4/2010 | Lundqvist et al. | 345/659 |
| 2010/0156919 | A1 | * | 6/2010 | Bala et al. | 345/582 |

FOREIGN PATENT DOCUMENTS

| | | |
|---|---|---|
| JP | 4-326152 | 11/1992 |
| JP | 10-40440 | 2/1998 |
| JP | 11-194856 | 7/1999 |
| JP | 2004-252715 | 9/2004 |

(Continued)

OTHER PUBLICATIONS

Japanese Office Action issued Jan. 8, 2013, in Japan Patent Application No. 2009-067131.

Primary Examiner — Ryan R Yang
(74) Attorney, Agent, or Firm — Oblon, Spivak, McClelland, Maier & Neustadt, L.L.P.

(57) ABSTRACT

This invention relates to an information processing apparatus that includes a judging unit that judges a usage state of the information processing apparatus; a deciding unit that decides, according to the usage state, a position at which a display element on a display screen on a display unit is to be arranged in either a normal position or an inverted position on the display screen; and a display control unit that controls for arranging the display element in a determined position and for displaying the display element in the determined position on the display screen.

9 Claims, 21 Drawing Sheets

FOREIGN PATENT DOCUMENTS

| | | |
|---|---|---|
| JP | 2006-53678 | 2/2006 |
| JP | 2007-122287 | 5/2007 |
| JP | 2007-272927 | 10/2007 |
| JP | 2009-25944 | 2/2009 |
| JP | 4340135 | 7/2009 |

* cited by examiner

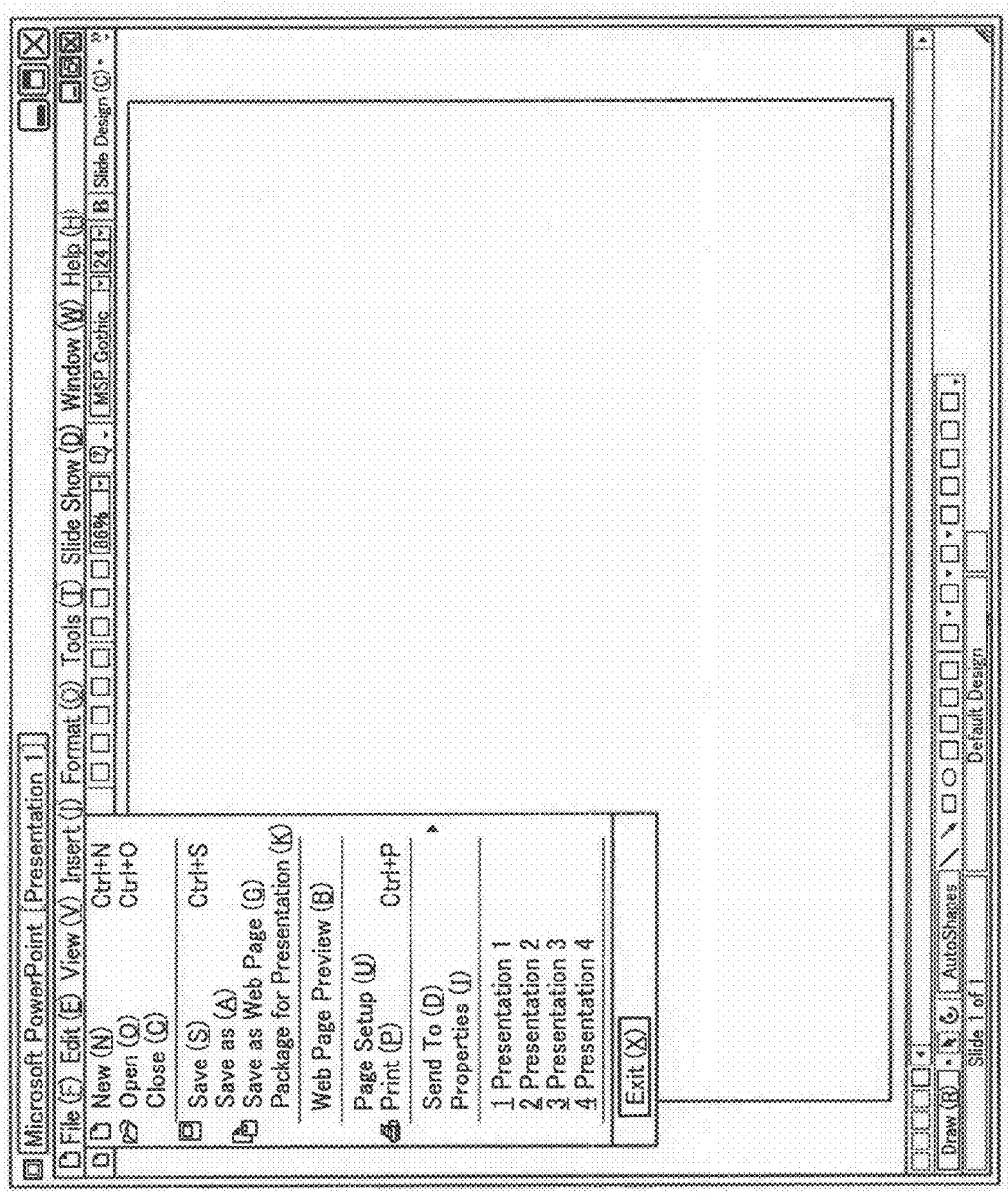

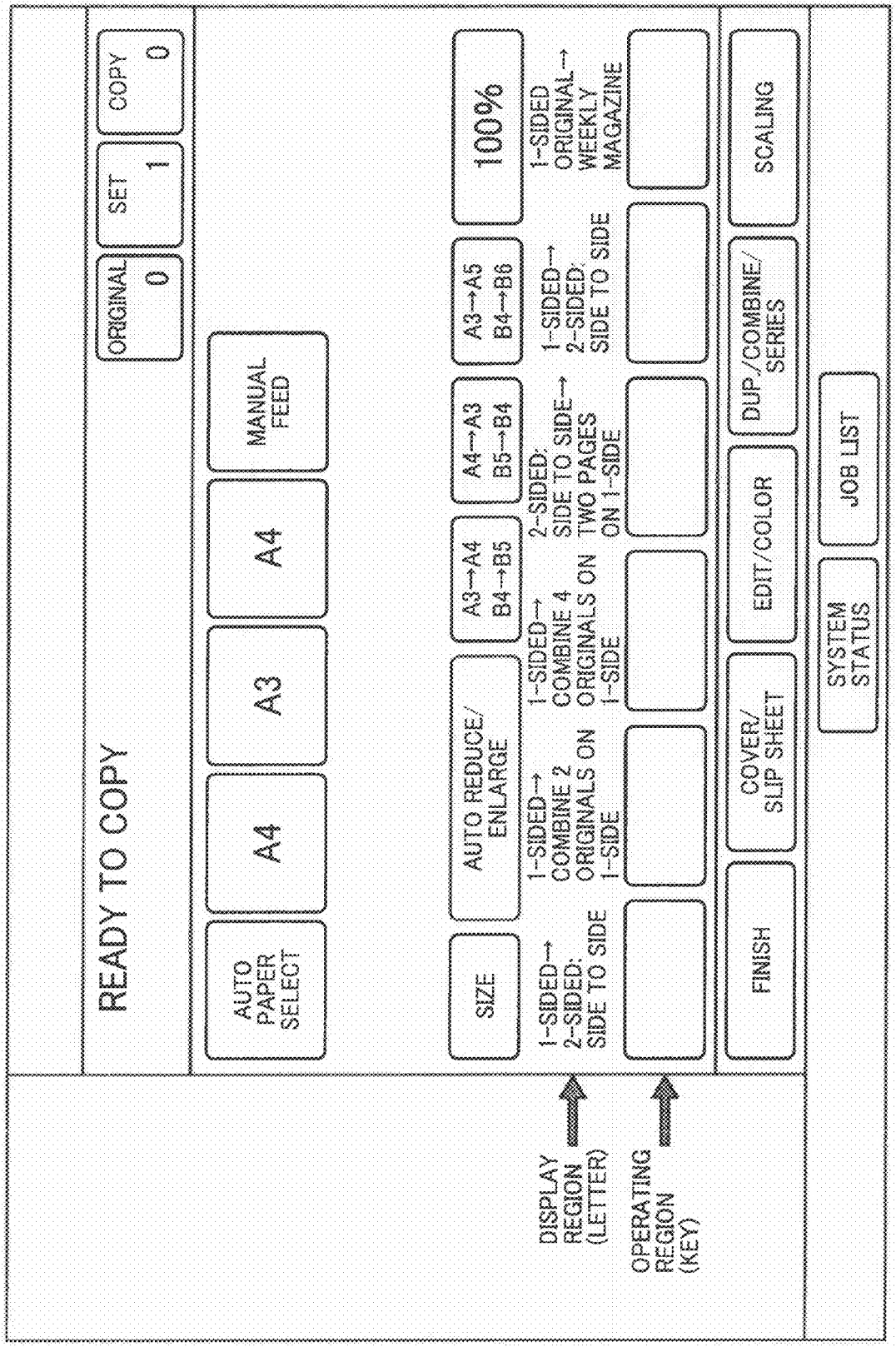

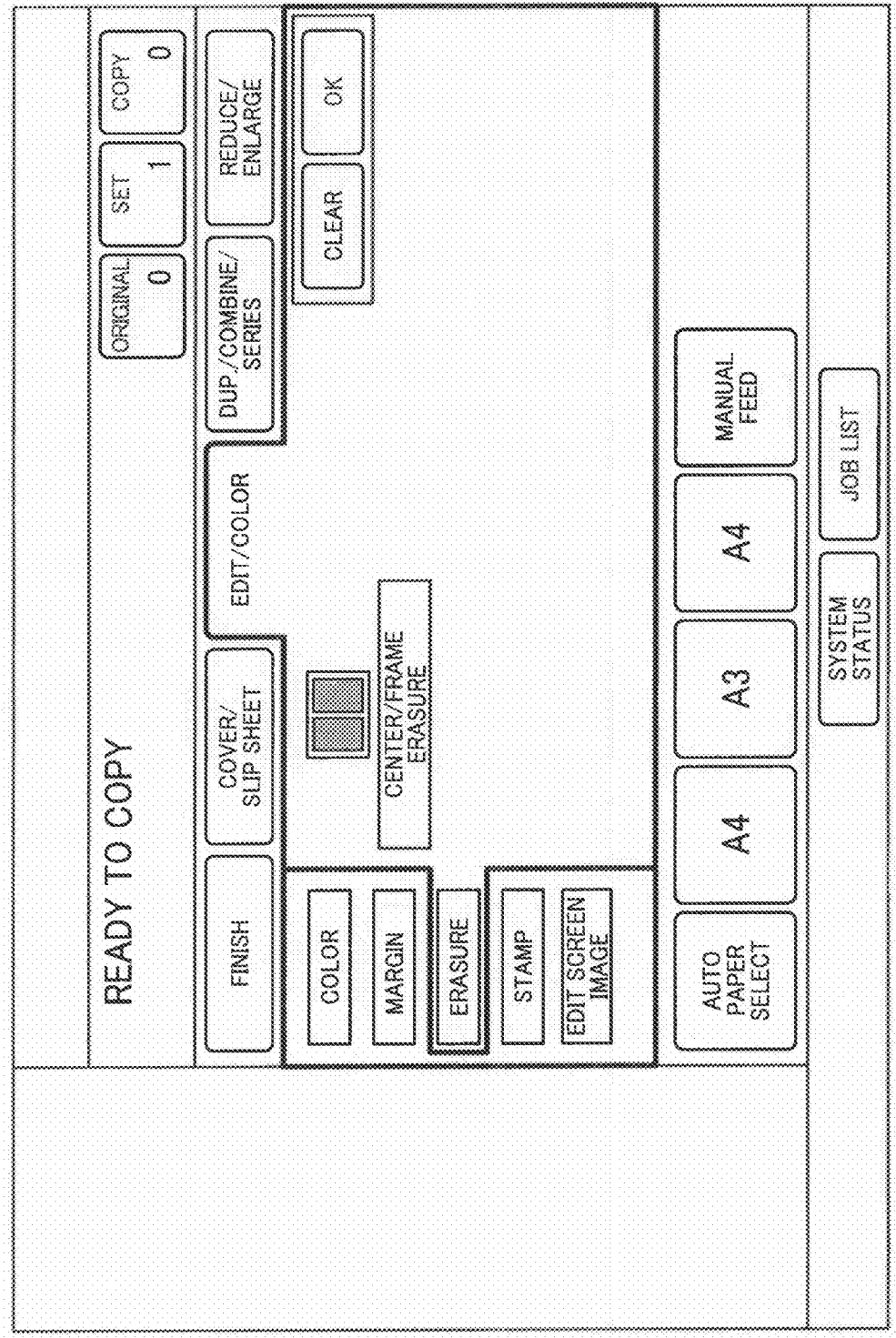

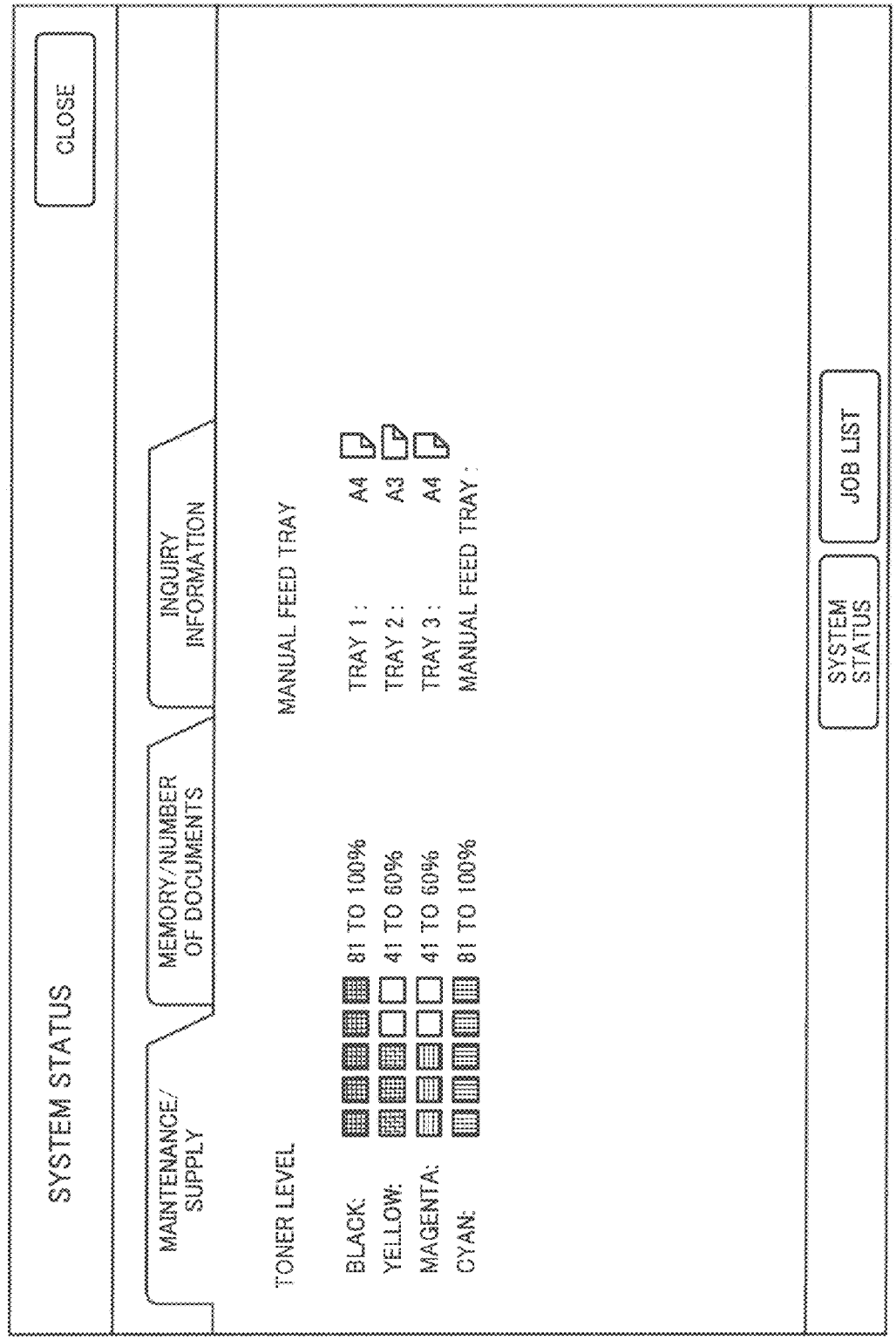

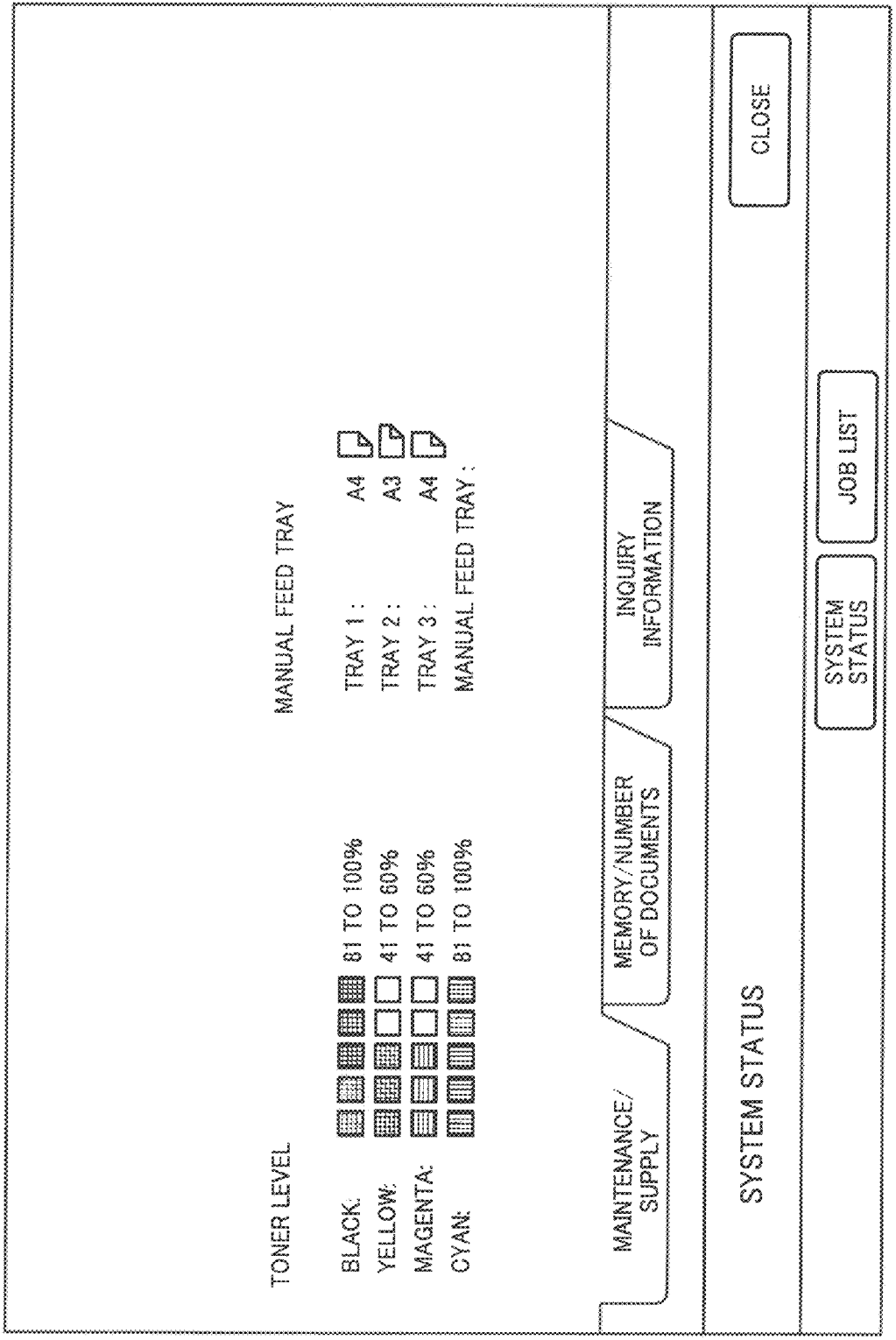

INFORMATION PROCESSING APPARATUS, DISPLAY PROCESSING METHOD, AND COMPUTER PROGRAM PRODUCT THEREFOR

CROSS-REFERENCE TO RELATED APPLICATIONS

The present application claims priority to and incorporates by reference the entire contents of Japanese Patent Application No. 2009-067131 filed in Japan on Mar. 18, 2009.

BACKGROUND OF THE INVENTION

1. Field of the Invention

The present invention relates to information processing apparatuses, display processing methods, and computer program product therefor.

2. Description of the Related Art

In recent years, apparatuses, such as copying machines, computers, and personal digital assistances (PDAs) equipped with touch panels as input devices, have increased. With such apparatuses equipped with touch panels, users input instructions by touching display screens with their fingers.

Screens displayed by conventional apparatus, on the other hand, are generally configured in a uniform manner. In other words, display elements that are only used to display something to users, or to display elements such as icons or tabs, through which users input instructions. Such locations are arranged at commonly-used regular positions on the screen. Specifically, conventional screens are generally configured that displayed elements through which the user inputs instructions are arranged generally on an upper portion of the screen.

Accordingly, when operating a horizontal touch panel, it is difficult for a user to operate the touch panel because the upper portion of the screen thereof is far from the user. In other words, with apparatuses equipped with a conventional type of touch panel, it is hard for users to press the touch panel having such a screen layout; operating the horizontal type touch panel is troublesome for users. A user's convenience is not considered.

Furthermore, when using an apparatus equipped with an operation display unit that can be adjusted in the range between horizontal and perpendicular, it is difficult to operate display elements when the display elements are used as input instructions. Especially, if the display elements are arranged on the upper portion of the screen, it is more difficult for a user to operate due to the angle (of elevation) between the operation display unit and the main body.

As described above, with conventional apparatuses, in some cases, the positions of display elements do not meet the preferences of users in terms of use of the apparatus. This causes a problem in that, depending on the intended use of the apparatus, it is difficult for the user to input instructions. (Patent Document 1: Japanese Patent Application Laid-open No. H10-40440)

SUMMARY OF THE INVENTION

It is an object of the present invention to at least partially solve the problems in the conventional technology.

According to an aspect of the present invention, there is provided an information processing apparatus including a judging unit that judges a usage state of the information processing apparatus; a deciding unit that decides, according to the usage state, a position at which a display element on a display screen on a display unit is to be arranged in either a normal position or an inverted position on the display screen; and a display control unit that controls for arranging the display element in a determined position and for displaying the display element in the determined position on the display screen.

According to another aspect of the present invention, there is provided a display processing method executed in an information processing apparatus including judging a usage state of the information processing apparatus; deciding, according to the usage state, a position at which a display element on a display screen on a display unit is to be arranged in either a normal position or an inverted position on the display screen; and display controlling for arranging the display element in a determined position and for displaying the display element in the determined position on the display screen.

According to still another aspect of the present invention, there is provided a computer program product including a computer-usable medium having computer-readable program codes embodied in the medium for processing information in an information processing apparatus, the program codes when executed causing a computer to execute: judging a usage state of the information processing apparatus; deciding, according to the usage state, a position at which a display element on a display screen on a display unit is to be arranged in either a normal position or an inverted position on the display screen; and display controlling for arranging the display element in a determined position and for displaying the display element in the determined position on the display screen.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7A is an example of a screen display in a case where the information processing apparatus is a laptop computer;

FIG. 16B is an example of a screen display on an operation display unit of the MFP;

FIG. 17A is an example of a screen display on an operation display unit of the MFP;

FIG. 18A is an example of a screen display on an operation display unit of the MFP; and FIG. 18B is an example of a screen display on an operation display unit of the MFP.

DETAILED DESCRIPTION OF THE PREFERRED EMBODIMENTS

Exemplary embodiments of an information processing apparatus, information processing method, and computer program product therefore according to the present invention are described in detail below with reference to the accompanying drawings.

Figure 1:
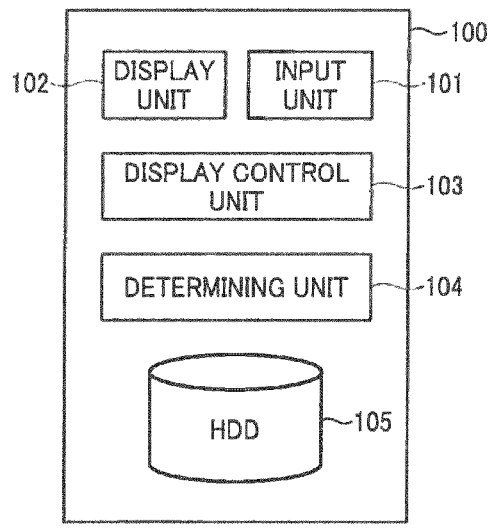
FIG. 1 is a block diagram illustrating the functional configuration of an information processing apparatus according to a first embodiment.

FIG. 1 is a block diagram illustrating the functional configuration of an information processing apparatus according to a first embodiment. As shown in FIG. 1, an information processing apparatus 100 according to the embodiment mainly includes a display unit 102, an input unit 101, a display control unit 103, a determining unit 104, and a hard disk drive (HDD) 105.

The display unit 102 is a device that is used to display a display screen such as a display unit. The input unit 101 is an input device such as a mouse or a keyboard. The display unit 102 and the input unit 101 can be configured to be an input display device equipped with a touch panel.

The determining unit 104 determines the usage state of the information processing apparatus 100. Specifically, the determining unit 104 determines the angle, or an elevation angle, formed between the display unit 102 and the apparatus main body.

The display control unit 103 performs control on displaying data to be displayed on the display unit 102. Furthermore, the display control unit 103 changes the position or positions of one or a plurality of display elements contained in displayed data in accordance with the usage state of the information processing apparatus 100.

Specifically, the display control unit 103 changes positions of the display elements from an upper portion to a lower portion of the screen according to the usage state of the information processing apparatus, and changes positions thereof in an inverted manner. Furthermore, the display control unit 103 displays display elements on one side of the screen according to the usage state of the information processing apparatus. Specific examples of changing the positions of the display elements are described below.

In addition to the display elements that are only used for displaying, the display elements include display elements that are used for inputting instructions. Examples of display elements that are used for inputting instructions include icons, tabs, list boxes, or the like; however, the display elements are not limited thereto. Furthermore, the display elements include, in addition to a single element such as an icon, a region bordering a certain area of the screen.

The HDD 105 is a memory medium that stores therein data such as the displayed data or a display element.

Figure 2:
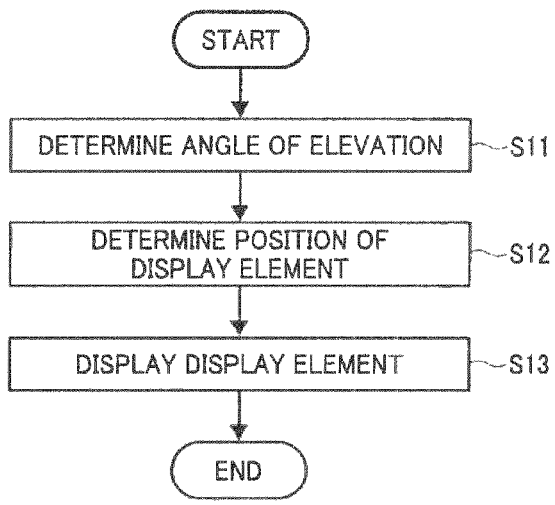
FIG. 2 is a flowchart illustrating the flow of display processing performed in the first embodiment.

In the following, display processing according to the embodiment is described. FIG. 2 is a flowchart illustrating the flow of the display processing performed in the first embodiment.

Figure 3:
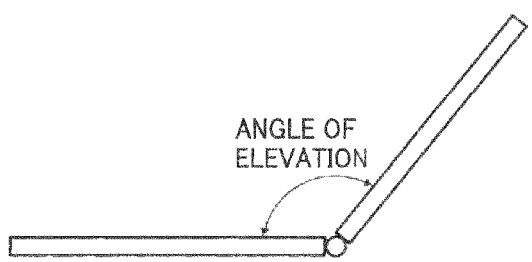
FIG. 3 is a schematic diagram illustrating the angle between a display unit 102 and the apparatus main body.
Figure 4:
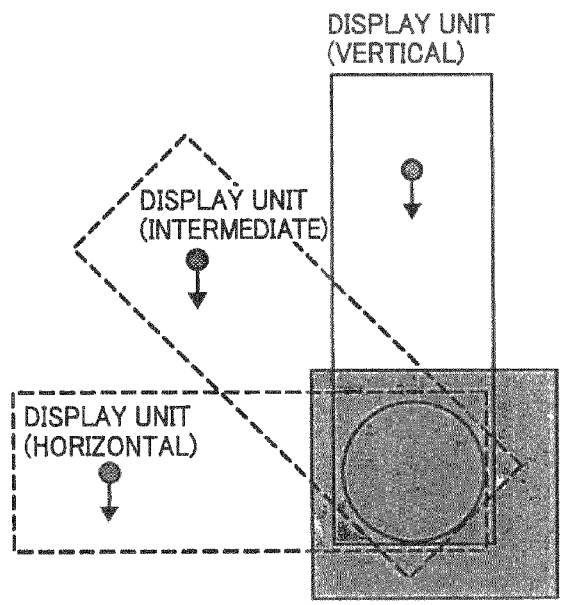
FIG. 4 is a schematic diagram illustrating an example method of detecting the angle between the display unit 102 and the apparatus main body.
Figure 5:
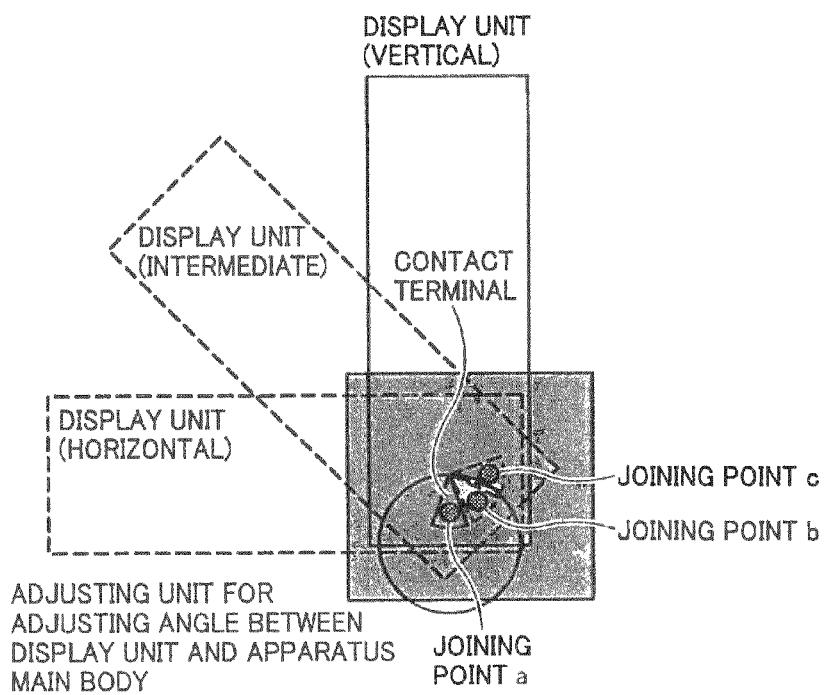
FIG. 5 is a schematic diagram illustrating an example method of detecting the angle between the display unit 102 and the apparatus main body.

First, the determining unit 104 determines the angle, or the angle of elevation, between the display unit 102 and the apparatus main body as the usage state of the information processing apparatus 100 (Step S11). FIG. 3 is a schematic diagram illustrating the angle between the display unit 102 and the apparatus main body. Various methods can be used for determining this angle. FIGS. 4 and 5 are schematic diagrams illustrating example methods of detecting the angle between the display unit 102 and the apparatus main body. In the example shown in FIG. 4, an inclination detecting device similar to a digital level gauge or an angle meter is arranged at the joining portion of the main body and the display unit 102. The inclination detecting device is configured to detect the angle between the display unit 102 and the main body.

In the example shown in FIG. 5, a plurality of joining points is arranged inside the joining portion where the main body and the display unit 102 are joined. When a rotation shaft of the joining portion, where the main body and the display unit 102 are joined, comes into contact with one of the joining points, the angle between the display unit 102 and the main body is detected from the joining point where the rotation axis contacts.

Referring back to FIG. 2, after detecting the angle between the display unit 102 and the main body at Step S11, the display control unit 103 determines the position of the display element according to the angle (Step S12). For example, if the angle is between 0° and 90°, the display element that is used for inputting an instruction is configured to be displayed on the upper portion of the screen. If the angle is between 90° and 180°, the display element that is used for inputting the instruction is configured to be displayed on the lower portion of the screen, i.e., on a side closer to a user.

When the position of the display element is determined, the display control unit 103 displays data to be displayed including the display element on the display unit 102 (Step S13).

Figure 6A:
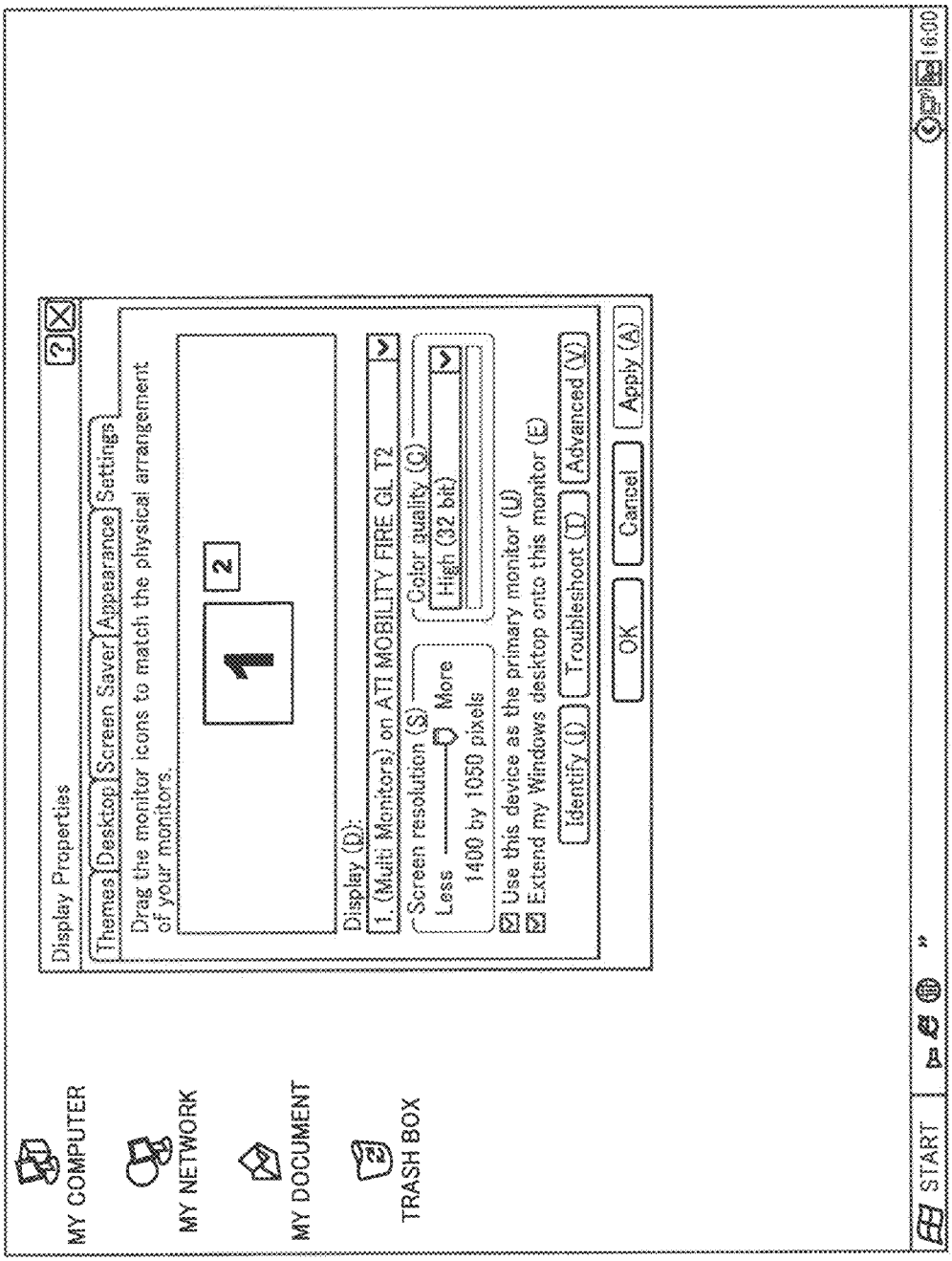
FIG. 6A is an example of a screen display in a case where the information processing apparatus is a laptop computer.
Figure 6B:
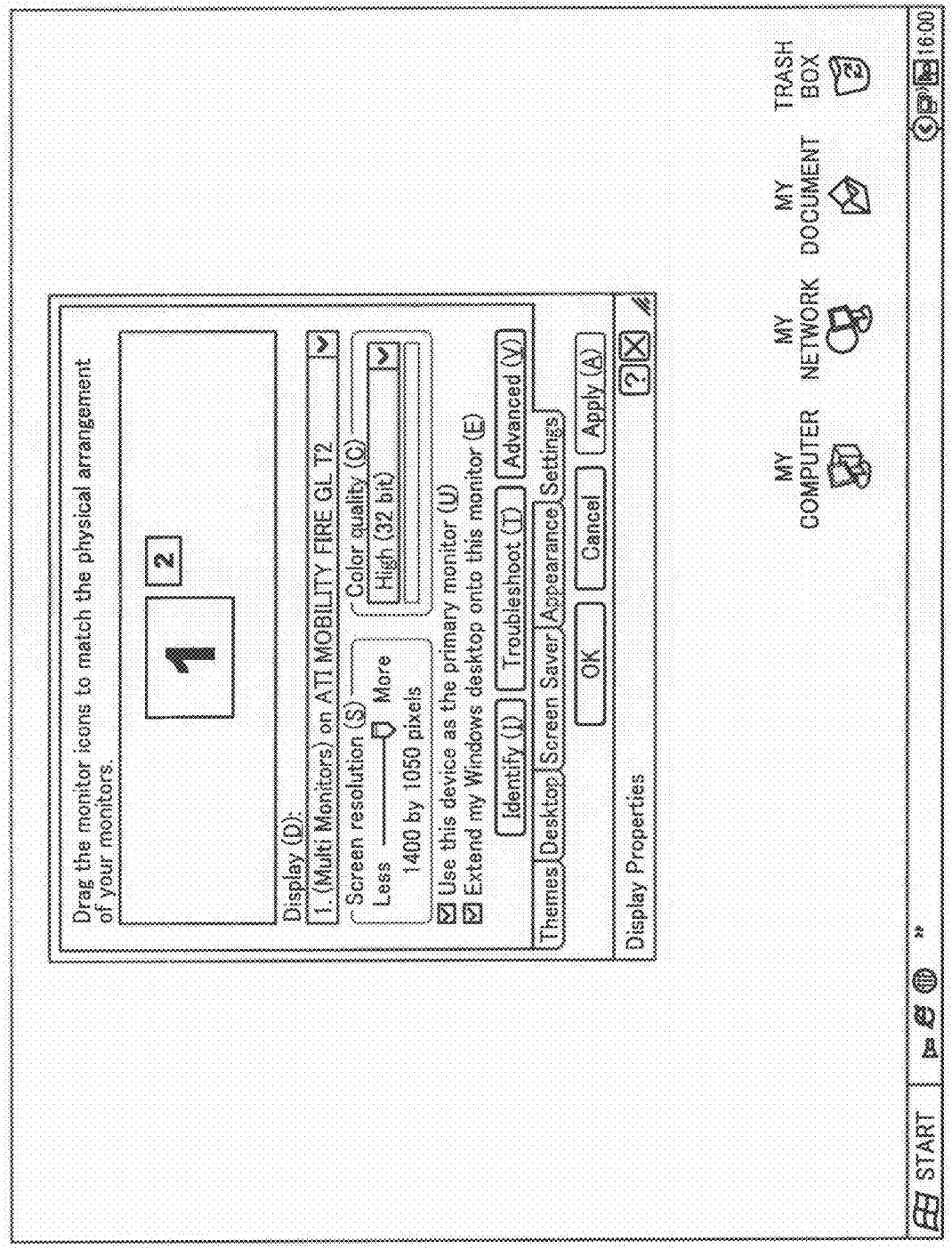
FIG. 6B is an example of a screen display in a case where the information processing apparatus is a laptop computer.

Next, examples of positioning the display element on the screen are described. FIGS. 6A, 6B, 7A, 7B, 8A, 8B, 9A, and 9B are examples of the screen display in a case where the information processing apparatus is a laptop computer. As shown in FIG. 6A, if the display unit 102 and the main body are almost perpendicular, in a similar manner as with a conventional computer screen, tabs serving as the display elements are arranged on the upper portion of the screen; whereas, if the display unit 102 and the main body are almost horizontal, as shown in FIG. 6B, tabs serving as the display elements are arranged on the lower portion of the screen.

Figure 7B:
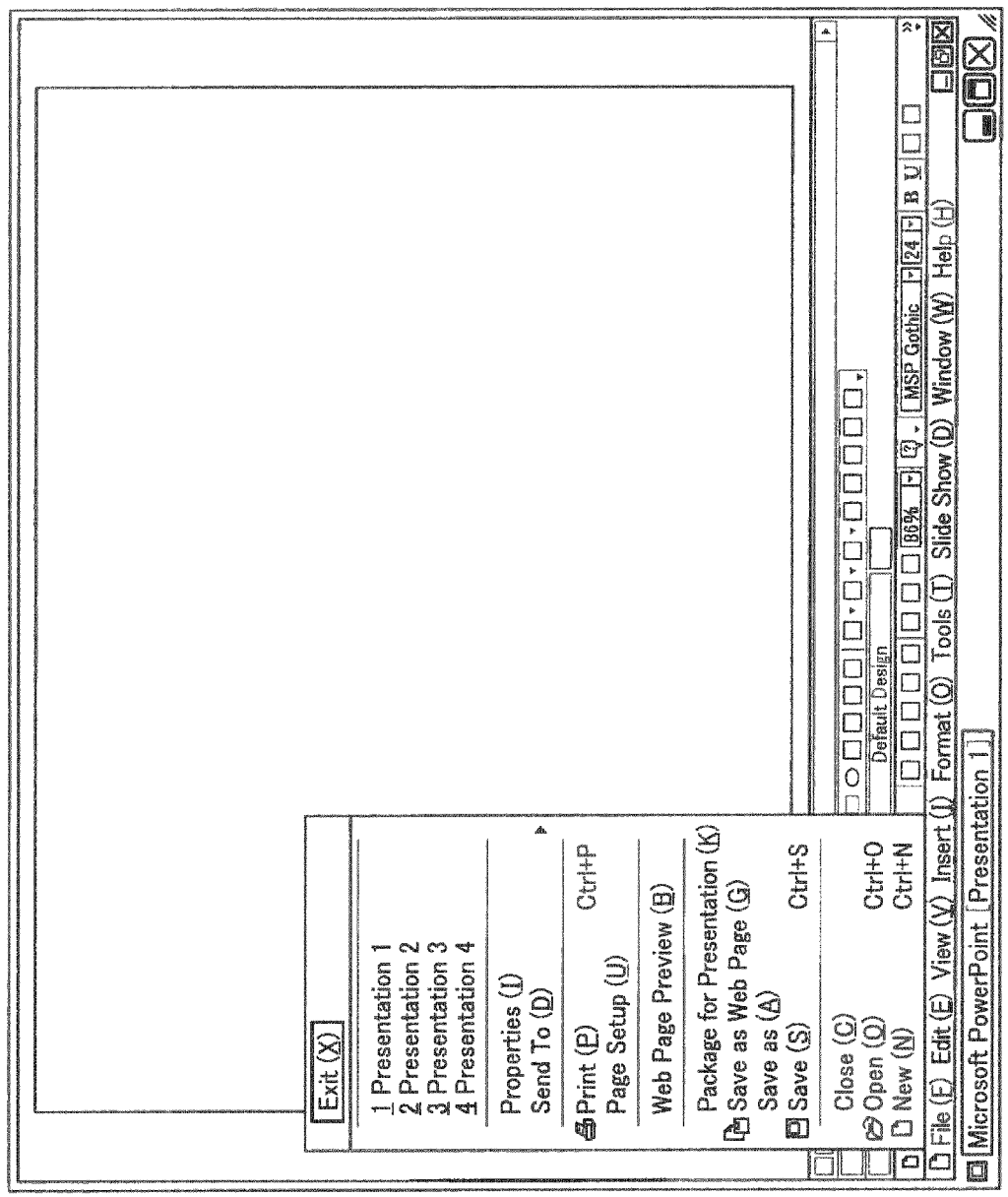
FIG. 7B is an example of a screen display in a case where the information processing apparatus is a laptop computer.

As shown in FIG. 7A, if the display unit 102 and the main body are almost perpendicular, in a similar manner as with a conventional computer screen, an operating region, serving as a display element where tabs or keys are aligned, is arranged on the upper portion of the screen; whereas, if the display unit 102 and the main body are almost horizontal as shown in FIG. 7B, an operation region is arranged on the lower portion of the screen. Furthermore, the items displayed in the operating region shown in FIG. 7A are displayed in inverted order of those shown in FIG. 7B.

Figure 8A:
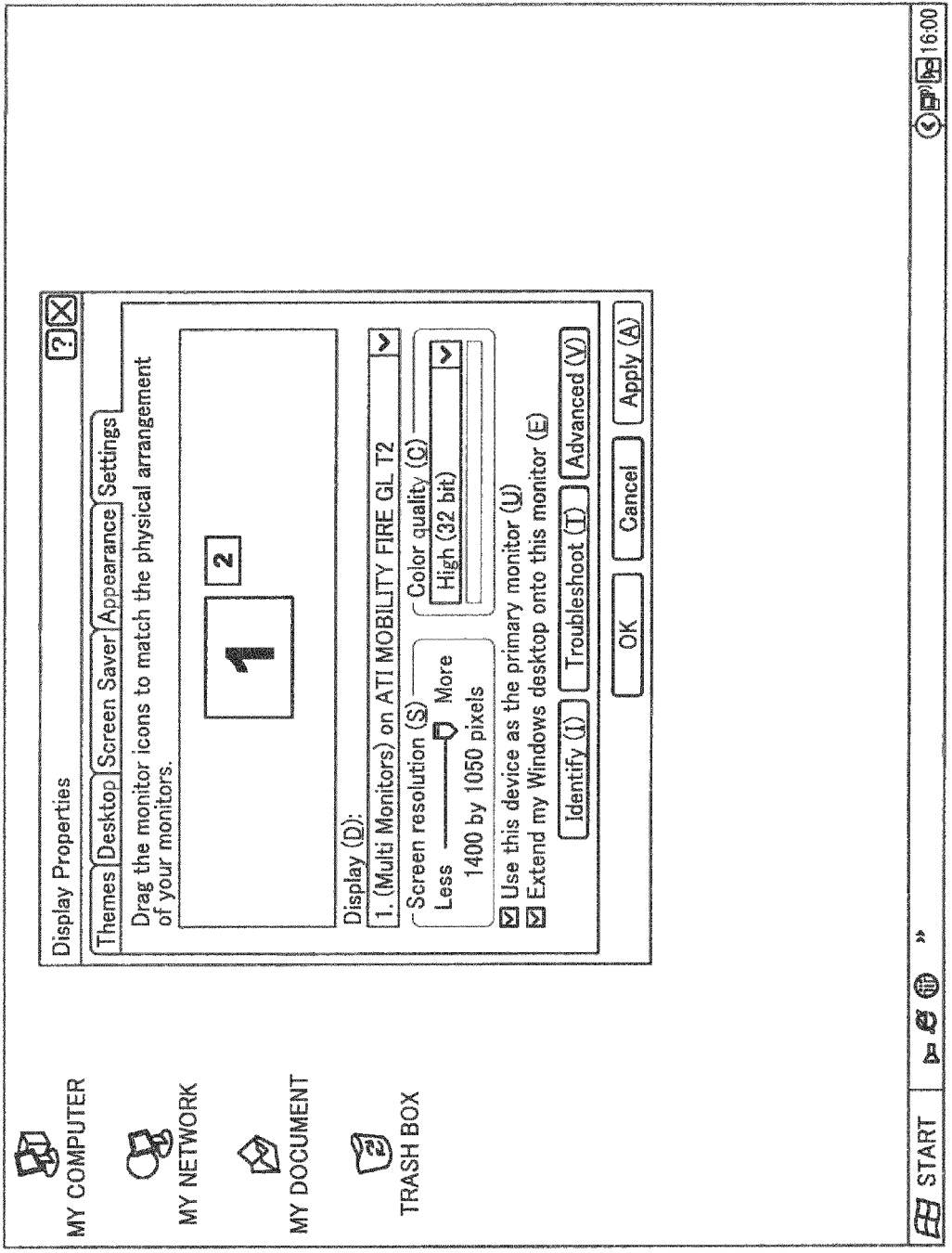
FIG. 8A is an example of a screen display in a case where the information processing apparatus is a laptop computer.
Figure 8B:
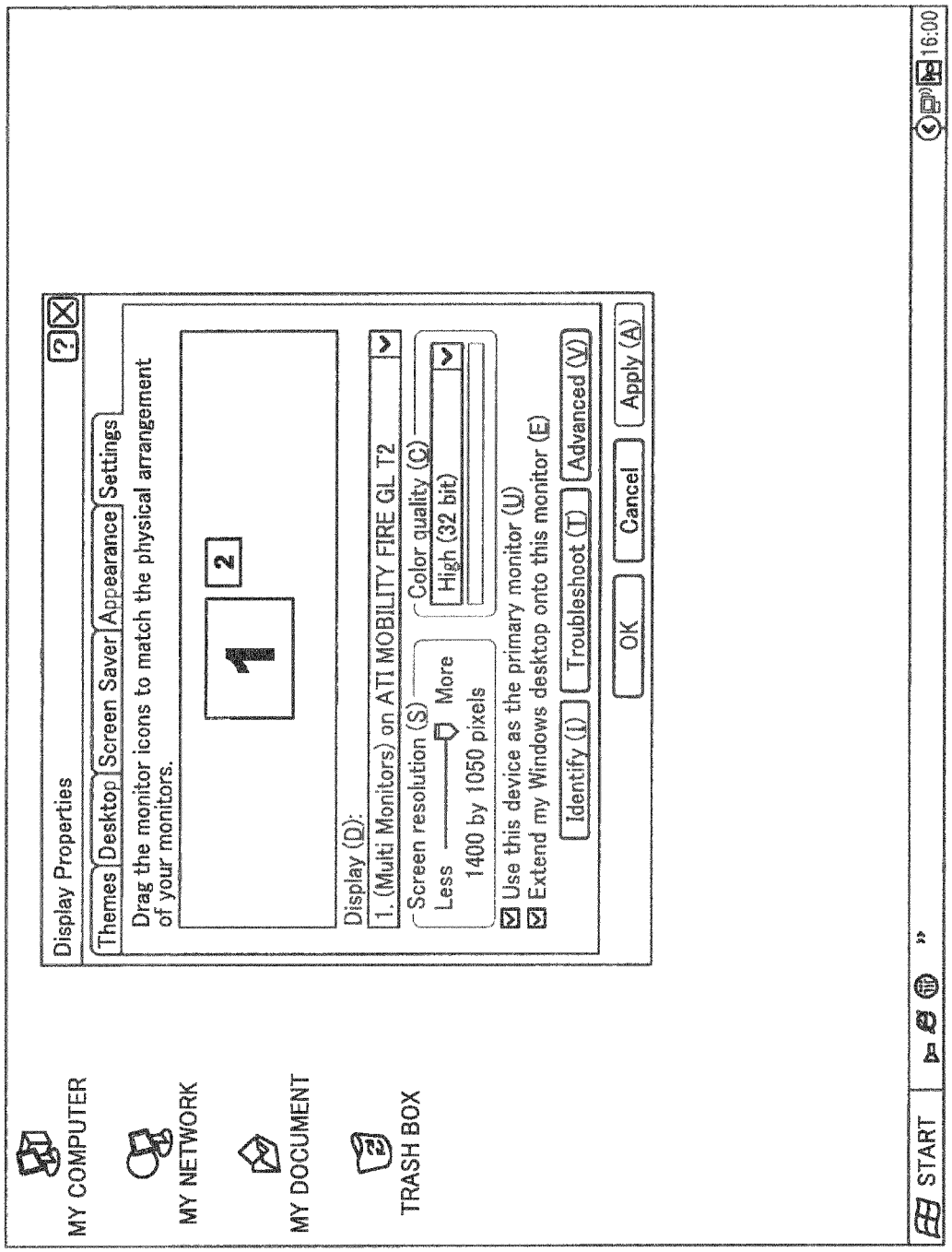
FIG. 8B is an example of a screen display in a case where the information processing apparatus is a laptop computer.
Figure 9A:
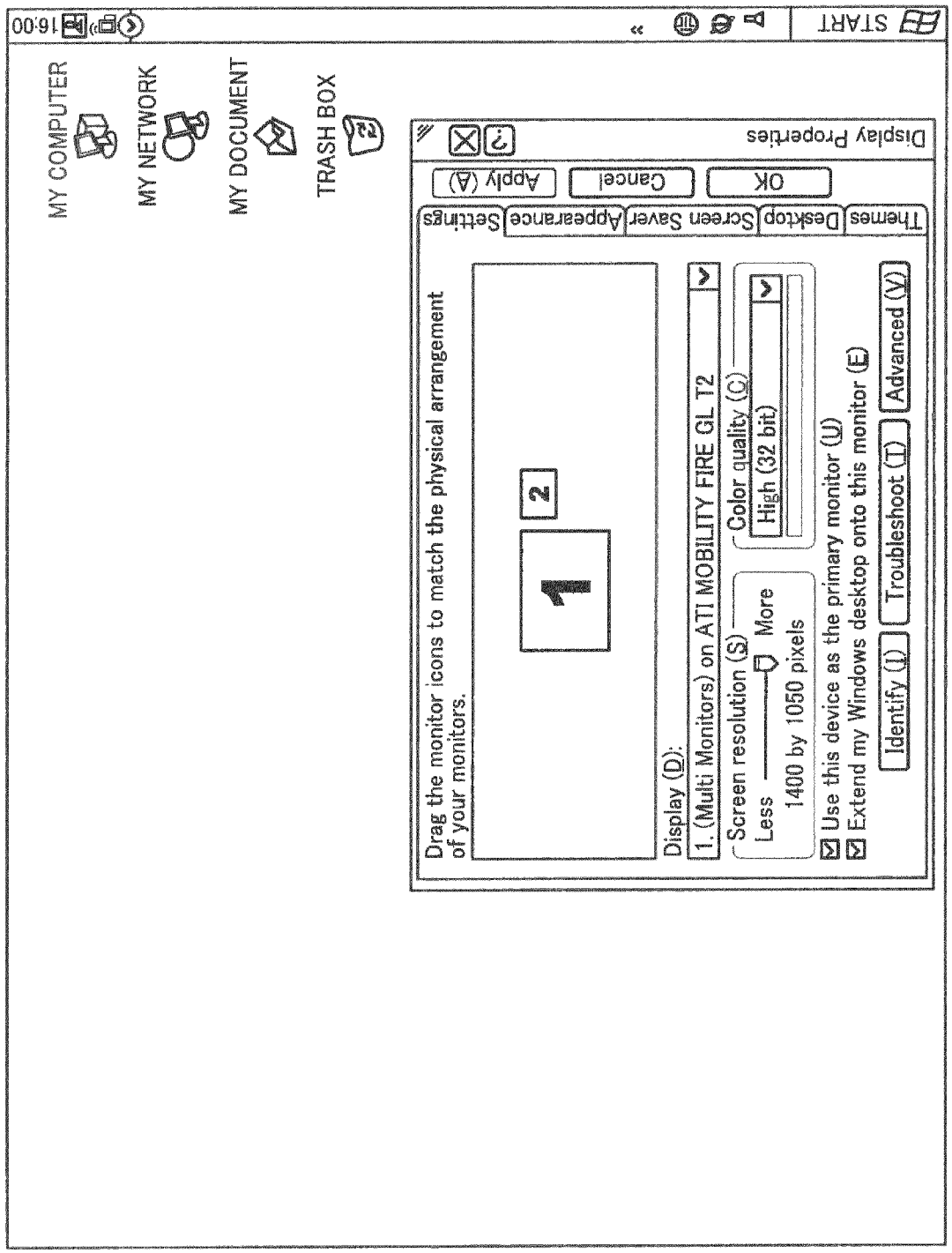
FIG. 9A is an example of a screen display in a case where the information processing apparatus is a laptop computer.
Figure 9B:
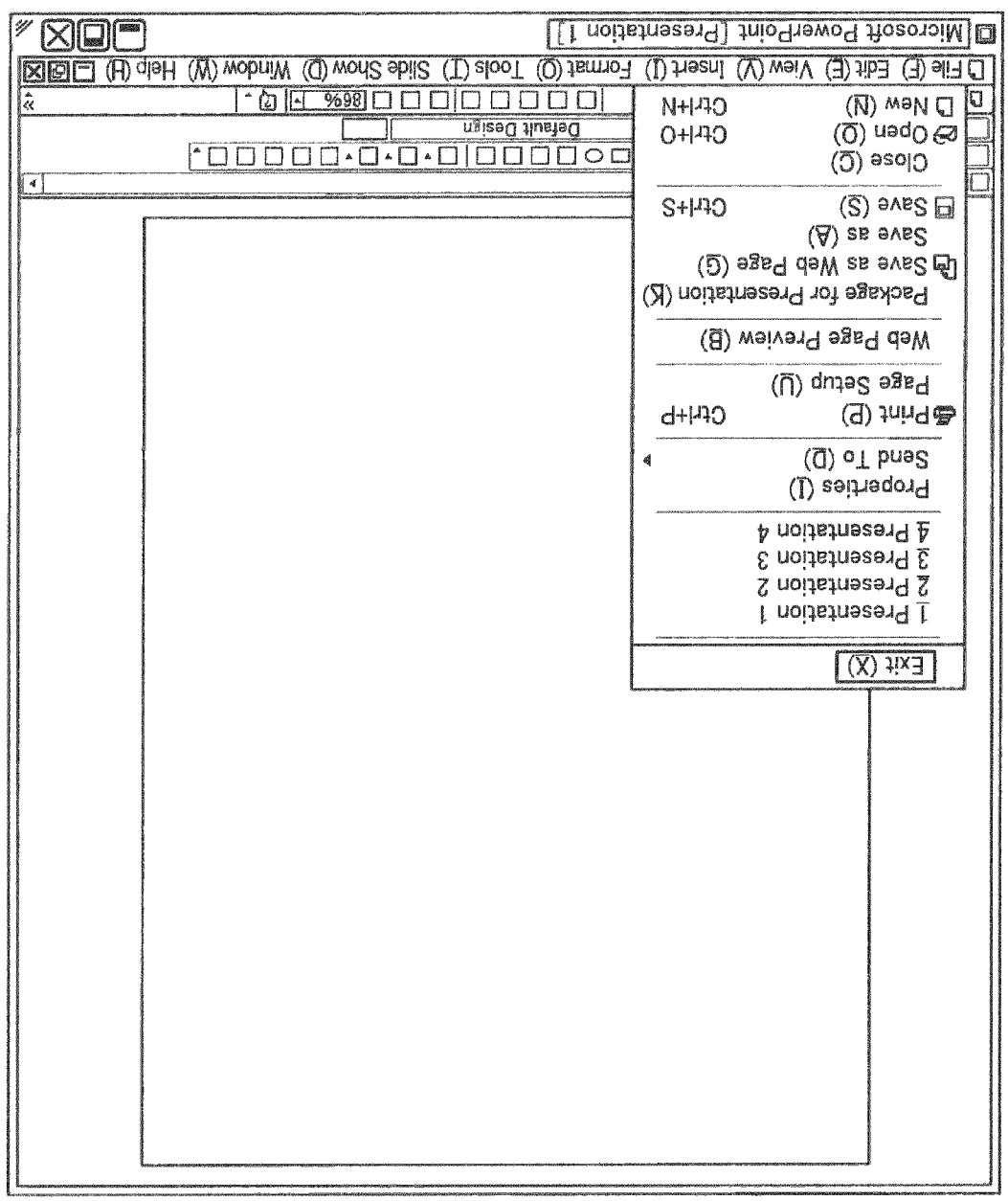
FIG. 9B is an example of a screen display in a case where the information processing apparatus is a laptop computer.

FIGS. 8A, 8B, and 9A are examples of a case where the display elements are icons; in a similar manner as in the above-described case, the positions of the icons shown in FIGS. 8A and 8B are inverted in relation to each other.

In the examples described above as the usage state of the apparatus, the position of the display element is changed by determining the angle between the display unit and the main body; however, the usage state is not limited thereto. For example, the determining unit 104 determines whether a user is a right-handed person or a left-handed person from a history of click operations of the mouse by referring to an input history of the user stored in the memory medium such as the HDD 105. If the user is a right-handed person, the configuration of the standard screen on the display control unit 103 shown in FIG. 9A can be changed in such the manner shown in FIG. 9B, where the display elements are arranged side by side on the right side.

Figure 10:
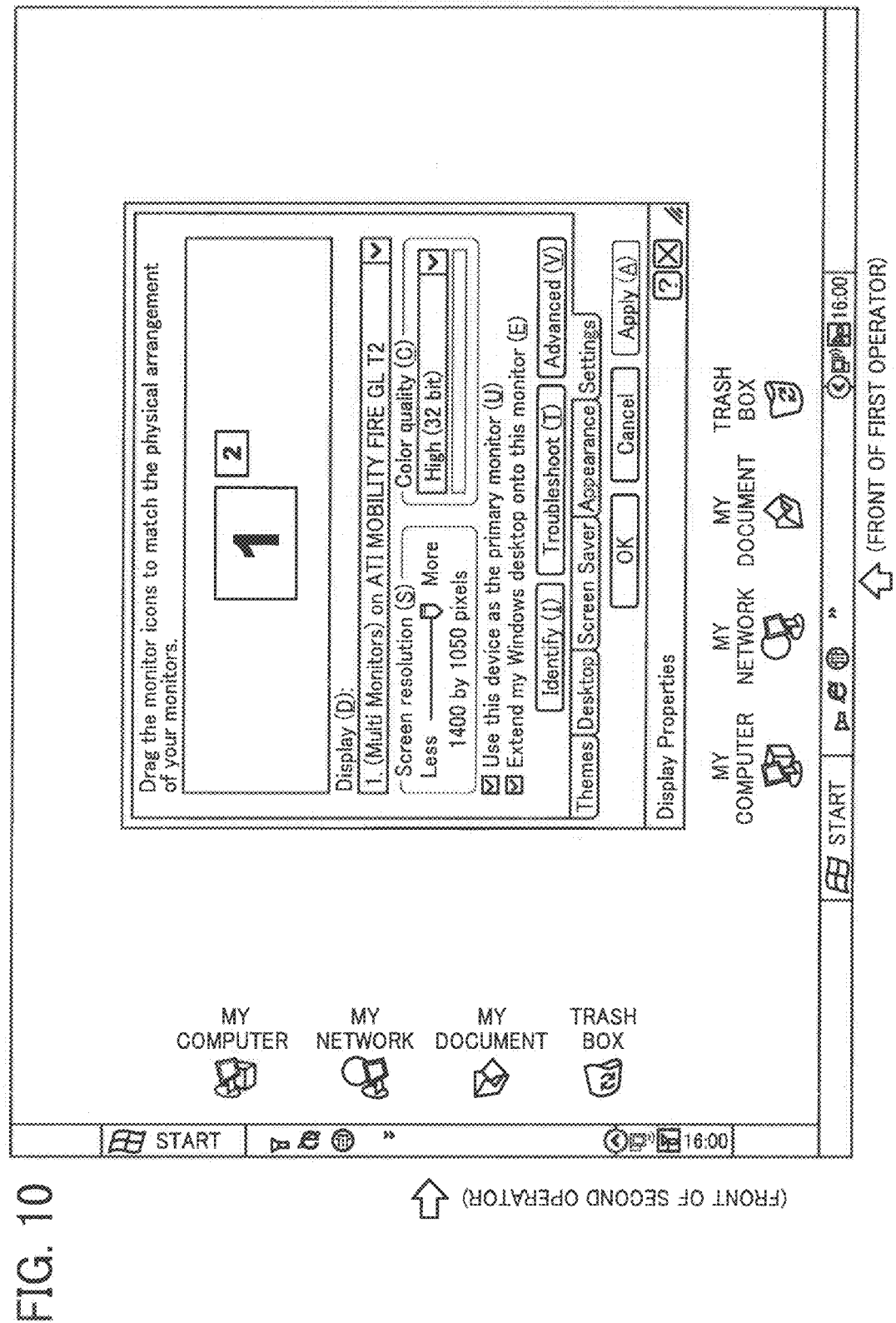
FIG. 10 is an example of a screen display in a case where the information processing apparatus is a table-type touch panel.
Figure 11:
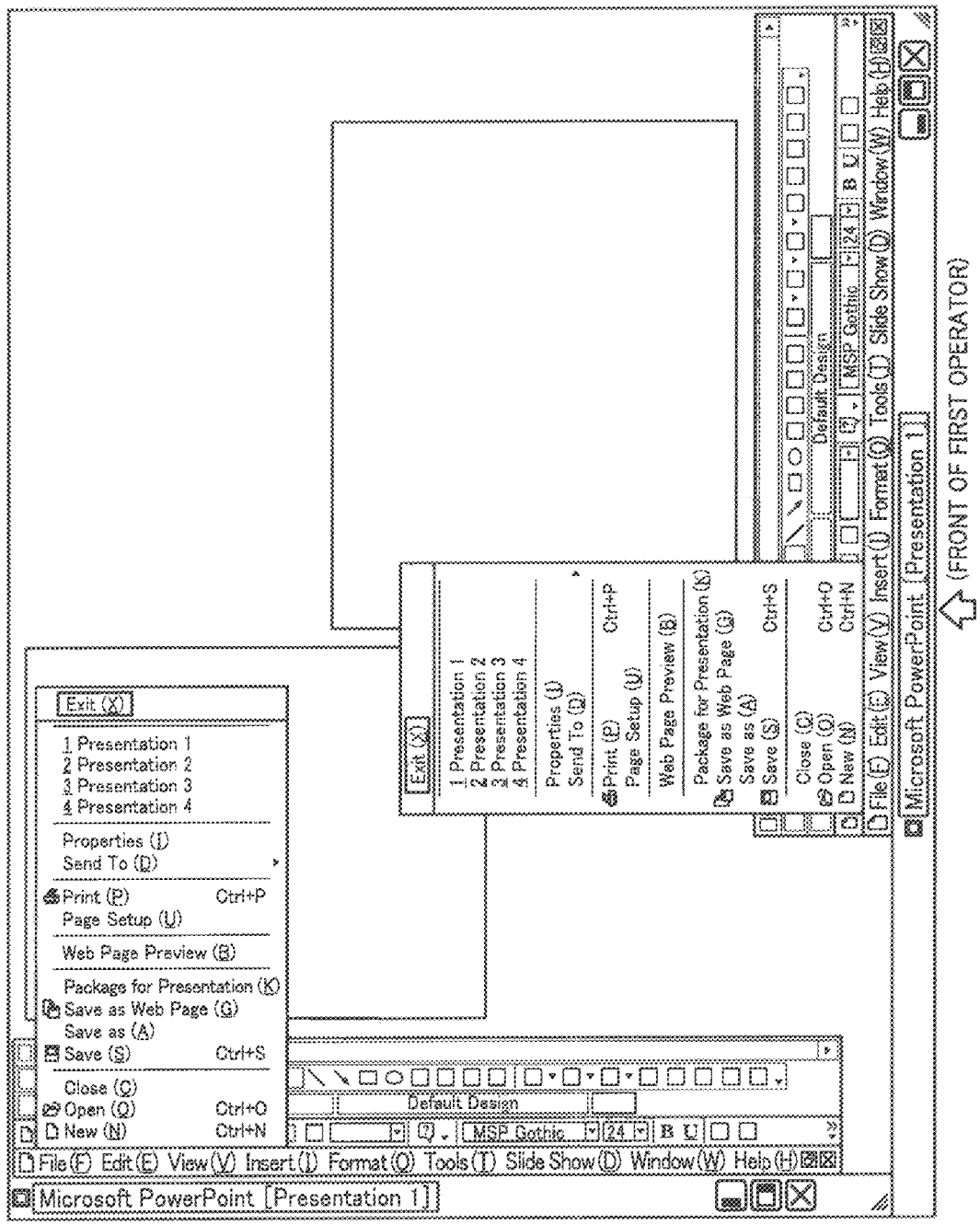
FIG. 11 is an example of a screen display in a case where the information processing apparatus is a table-type touch panel.
Figure 12:
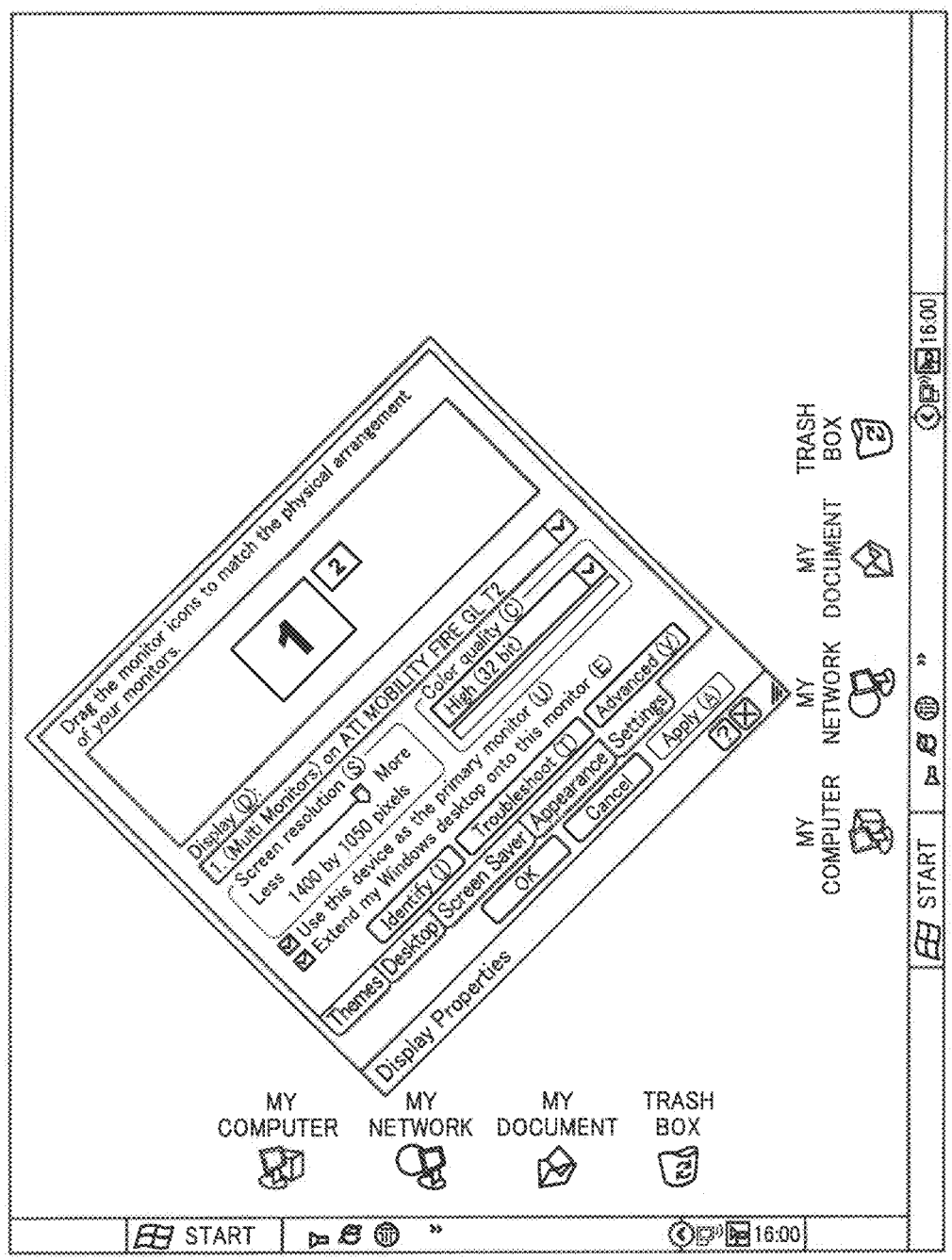
FIG. 12 is an example of a screen display in a case where the information processing apparatus is a table-type touch panel.

Furthermore, if the information processing apparatus is a table type touch panel, the determining unit 104 can be configured to detect the position where the user is seated by using a motion detection sensor or the like. As shown in FIGS. 10 and 12, the display control unit 103 can be configured such that the display element is displayed near the detected position. In such a case, if a plurality of users is detected, as shown in FIG. 11, the display control unit 103 can be configured such that the display elements are displayed near each of the detected positions.

Figure 13:
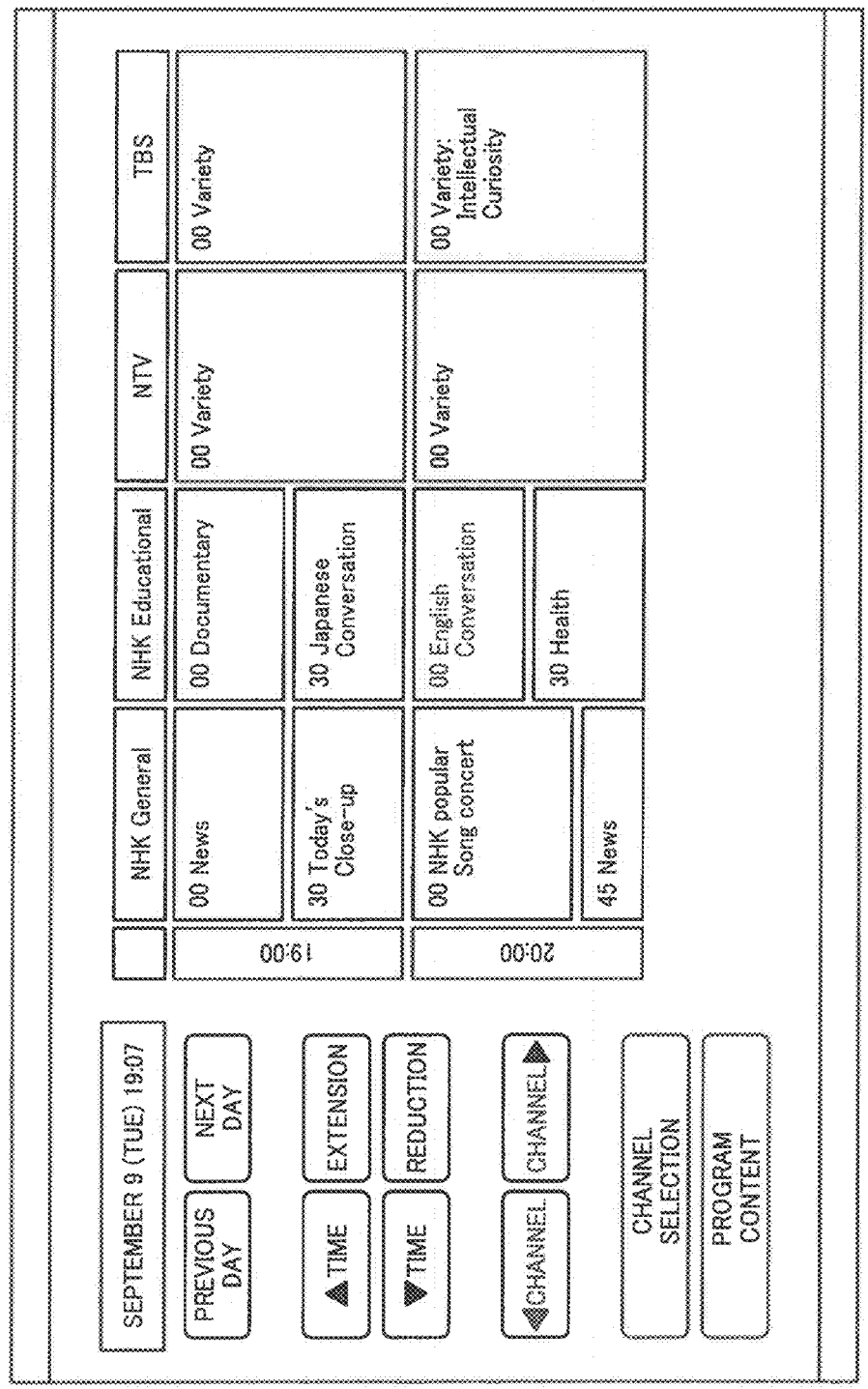
FIG. 13 is an example of a screen display in a case where the information processing apparatus is a car navigation device.
Figure 14:
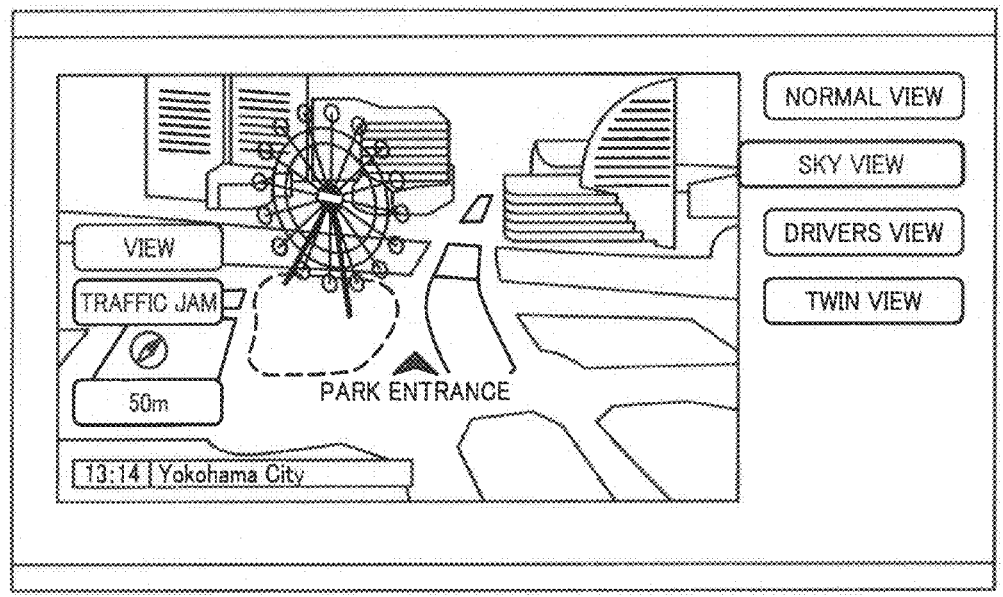
FIG. 14 is an example of a screen display in a case where the information processing apparatus is a car navigation device.

Furthermore, if the information processing apparatus is a car navigation device, the determining unit 104 can be configured to determine whether a driver's seat is placed on a right side or a left side. As shown in FIGS. 13 and 14, the display control unit 103 can be configured to display a navigation screen serving as a display element on a screen on the driver's side.

Figure 15:
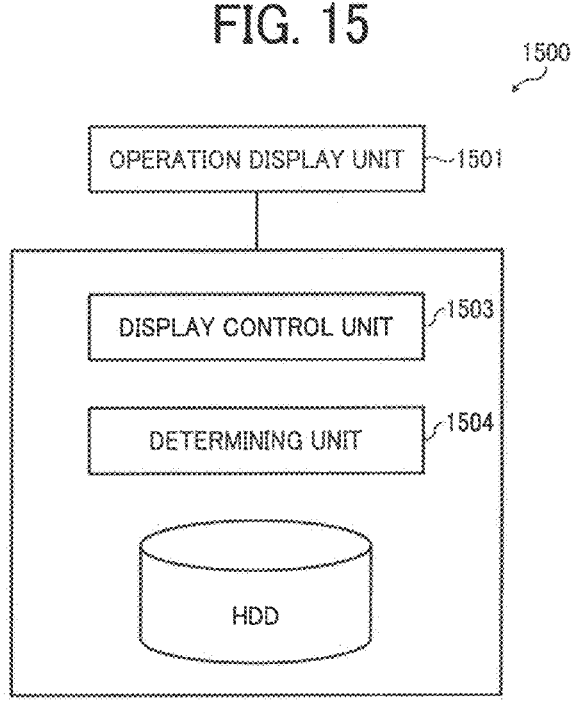
FIG. 15 is a block diagram illustrating the functional configuration of an MFP (Multi Function Printer) 1500 serving as the image forming apparatus.

In a second embodiment, the present invention is applied to an image forming apparatus. FIG. 15 is a block diagram illustrating the functional configuration of an MFP 1500 serving as the image forming apparatus.

As shown in FIG. 15, the MFP 1500 according to the present embodiment includes an operation display unit 1501, a display control unit 1503, a determining unit 1504, and an HDD 1505.

The operation display unit 1501 is a touch panel type device that displays various kinds of screens to a user and receives instructions that are input by the user. In the embodiment, the angle between the operation display unit 1501 and the main body can be changed.

The determining unit 1504 determines the usage state of the MFP 1500. The specific method of determining the usage state is the same as that described in the first embodiment.

The display control unit 1503 performs control on displaying data to be displayed on the operation display unit 1501. Furthermore, the display control unit 1503 changes a position or positions of one or a plurality of display elements in the displayed data according to the usage state of the MFP 1500. The specific function is the same as that described in the first embodiment. Furthermore, display processing performed in the embodiment is the same as that in the first embodiment; therefore, a description thereof is not repeated.

FIGS. 16A, 16B, 17A, 17B, 18A, and 18B show examples of the screen display of the display elements on the operation display unit 1501.

Figure 16A:
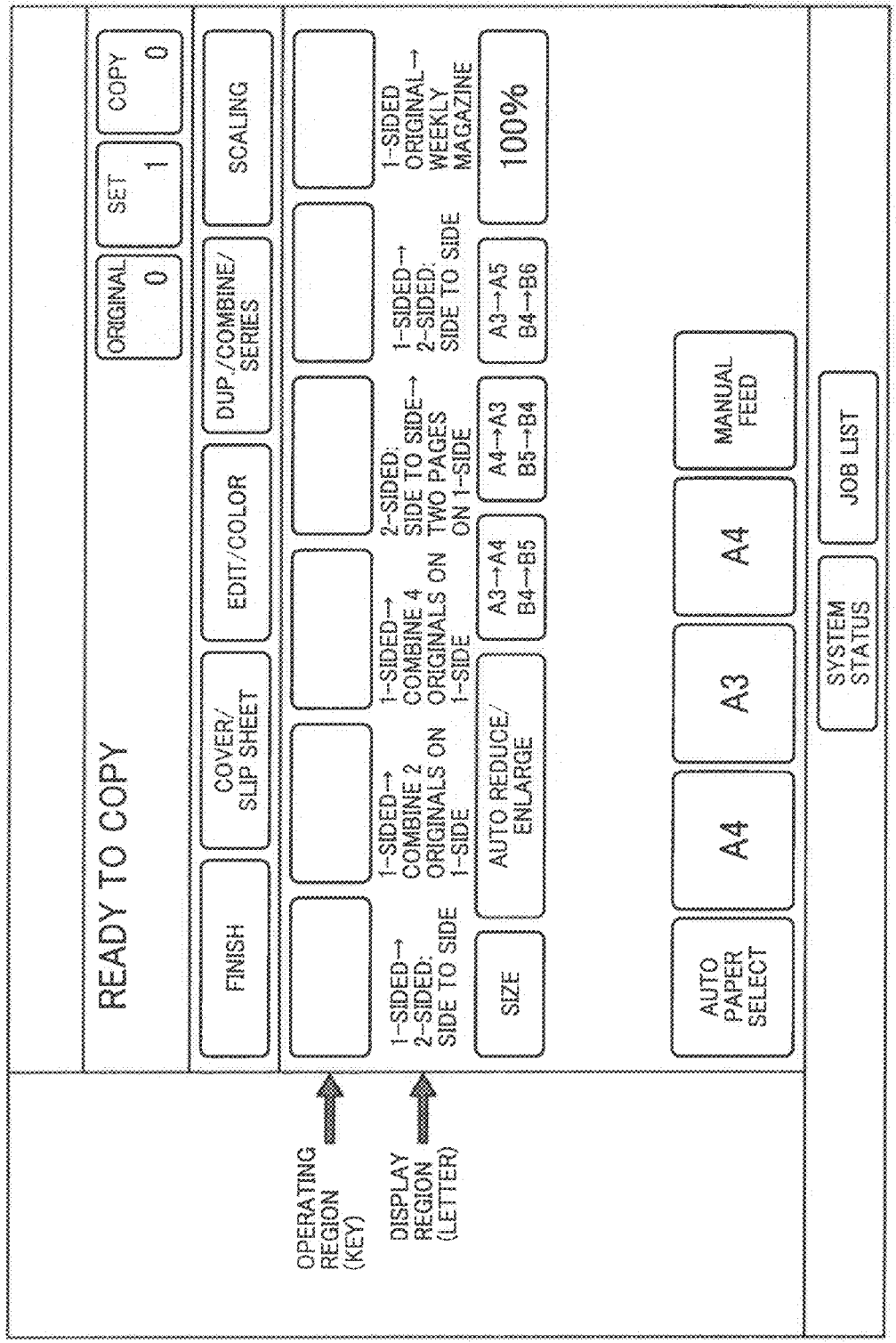
FIG. 16A is an example of a screen display on an operation display unit of the MFP.

As shown in FIG. 16A, if the operation display unit 101 and the main body are almost perpendicular, tabs serving as the display elements and keys indicating operating regions which are displayed on a menu screen for an application, are arranged on the upper portion of the screen. In contrast, as shown in FIG. 16B, if the operation display unit 1501 and the main body are almost horizontal, the tabs, serving as the display elements, are arranged on the lower portion of the screen; and the keys indicating the operating regions, are displayed side by side.

Figure 17B:
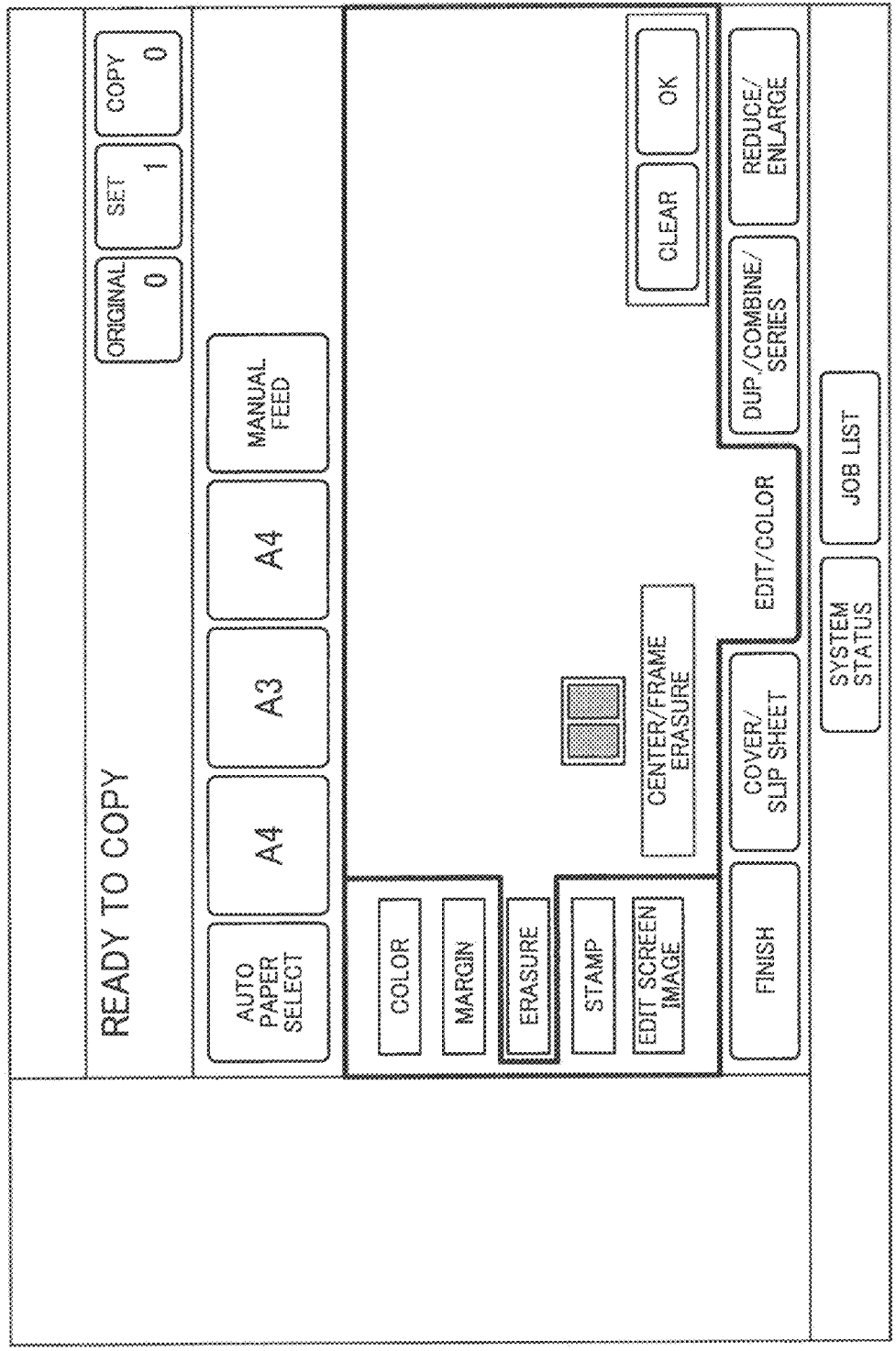
FIG. 17B is an example of a screen display on an operation display unit of the MFP.

Furthermore, as shown in FIG. 17A, if the operation display unit 101 and the main body are almost perpendicular, tabs, serving as the display element displayed on a setting screen for an application, are arranged on the upper portion of the screen. In contrast, as shown in FIG. 17B, if the operation display unit 1501 and the main body are almost horizontal, the tabs, serving as the display elements, are arranged on the lower portion of the screen; and the keys, indicating the operating region, are displayed side by side on the lower portion thereof. In the examples shown in FIGS. 18A and 18B, the positions of the tabs are changed and displayed on the screen in a similar manner.

As described above, in the embodiment, because the positions of the display elements on the screen are changed according to the usage state of the apparatus, it is possible for users to easily input the instructions regardless of their intended use of the apparatus.

The information processing apparatus and a display processing program that is executed by the MFP according to the embodiments are installed in advance in a ROM or the like.

The information processing apparatus and the display processing program that is executed by the MFP according to the embodiments can be configured such that files are stored, in an installable or executable manner, in a computer readable recording medium, such as a CD-ROM, a flexible disk (FD), a CD-R, a digital versatile disk (DVD), or the like.

Furthermore, the information processing apparatus and the display processing program that is executed by the MFP according to the embodiments can be configured to be stored in a computer connected to the network such as the Internet and be downloaded via a network. The information processing apparatus and the display processing programs that are executed by the MFP according to the embodiments can be configured to be provided or distributed via a network such as the Internet.

The information processing apparatus and the display processing program that is executed by the MFP according to the embodiment have a modular structure including the above described units (the display control unit and the determining unit). When hardware is actually used, a CPU (processor) reads the display and execute processing program from the ROM, whereby the above described units are loaded into the main storage device, and then the display control unit and the determining unit are created in the main storage device.

According to an aspect of the present invention, an advantage is provided in that it is possible for users to easily input instructions regardless of their intended use of an apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
   a judging unit that judges a usage state of the information processing apparatus;
   a deciding unit that decides, according to the usage state, a position at which a display element on a display screen on a display unit is to be arranged in either a normal position or an inverted position on the display screen; and
   a display control unit that controls for arranging the display element in a determined position and for displaying the display element in the determined position on the display screen,
   wherein the judging unit detects an angle of the display unit with respect to a main body of the information processing apparatus as the usage state,
   the deciding unit decides the position at which the display element is to be arranged on the display screen according to the angle detected,
   if the detected angle is within a predetermined range including an angle of 90 degrees, the deciding unit decides that the position at which the display element is to be arranged is on an upper side of the display screen, and
   if the detected angle is within a predetermined range including an angle of 180 degrees, the deciding unit decides that the position at which the display element is to be arranged is on a lower side of the display screen.

2. The information processing apparatus according to claim 1, wherein
   the judging unit is further configured to detect a position of a user as the usage state, and
   the deciding unit decides that the position at which the display element is to be arranged on the display screen is near a detected position of the user.

3. The information processing apparatus according to claim 1, wherein
   the judging unit is further configured to detect a dominant hand of a user as the usage state on a basis of usage history of the user, and
   the deciding unit decides that the position at which the display element is to be arranged on the display screen is near to a side of the dominant hand.

4. A display processing method executed in an information processing apparatus comprising:
   judging a usage state of the information processing apparatus, the judging detecting an angle of a display unit with respect to a main body of the information processing apparatus as the usage state;
   deciding, according to the usage state, a position at which a display element on a display screen on the display unit is to be arranged in either a normal position or an inverted position on the display screen, the deciding further deciding the position at which the display element is to be arranged on the display screen according to the angle detected, if the detected angle is within a predetermined range including an angle of 90 degrees, the deciding further deciding that the position at which the display element is to be arranged is on an upper side of the display screen, and if the detected angle is within a predetermined range including an angle of 180 degrees, the deciding further deciding that the position at which the display element is to be arranged is on a lower side of the display screen; and
   display controlling for arranging the display element in a determined position and for displaying the display element in the determined position on the display screen.

5. The method according to claim 4, wherein
   the judging is further configured to detect a position of a user as the usage state, and
   the deciding further decides that the position at which the display element is to be arranged on the display screen is near a detected position of the user.

6. The method according to claim 4, wherein
   the judging is further configured to detect a dominant hand of a user as the usage state on a basis of usage history of the user, and
   the deciding further decides that the position at which the display element is to be arranged on the display screen is near to a side of the dominant hand.

7. A non-transitory computer readable medium having stored thereon a computer program product that when executed by a computer causes the computer to implement a method for processing information in an information processing apparatus, comprising:
   judging a usage state of the information processing apparatus, the judging detecting an angle of a display unit with respect to a main body of the information processing apparatus as the usage state;
   deciding, according to the usage state, a position at which a display element on a display screen on the display unit is to be arranged in either a normal position or an inverted position on the display screen, the deciding further deciding the position at which the display element is to be arranged on the display screen according to the angle detected, if the detected angle is within a predetermined range including an angle of 90 degrees, the deciding further deciding that the position at which the display element is to be arranged is on an upper side of the display screen, and if the detected angle is within a predetermined range including an angle of 180 degrees, the deciding further deciding that the position at which the display element is to be arranged is on a lower side of the display screen; and
   display controlling for arranging the display element in a determined position and for displaying the display element in the determined position on the display screen.

8. The non-transitory computer readable medium according to claim 7, wherein
   the judging is further configured to detect a position of a user as the usage state, and
   the deciding further decides that the position at which the display element is to be arranged on the display screen is near a detected position of the user.

9. The non-transitory computer readable medium according to claim 7, wherein
   the judging is further configured to detect a dominant hand of a user as the usage state on a basis of usage history of the user, and
   the deciding further decides that the position at which the display element is to be arranged on the display screen is near to a side of the dominant hand.

* * * * *